(12) United States Patent
Acedo et al.

(10) Patent No.: US 9,170,807 B2
(45) Date of Patent: Oct. 27, 2015

(54) DETERMINING LOGICAL CONFIGURATION COMMANDS TO CREATE A LOGICAL OBJECT

(75) Inventors: Mario F. Acedo, Tucson, AZ (US);
Ezequiel Cervantes, Tucson, AZ (US);
Paul A. Jennas, II, Tucson, AZ (US);
Jason L. Peipelman, Vail, AZ (US);
Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 604 days.

(21) Appl. No.: 12/984,492

(22) Filed: Jan. 4, 2011

(65) Prior Publication Data

US 2012/0173856 A1   Jul. 5, 2012

(51) Int. Cl.
*G06F 9/44* (2006.01)
*G06F 3/06* (2006.01)

(52) U.S. Cl.
CPC ............... *G06F 8/71* (2013.01); *G06F 3/0605* (2013.01); *G06F 3/067* (2013.01); *G06F 3/0637* (2013.01); *G06F 3/0689* (2013.01)

(58) Field of Classification Search
CPC .............. G06F 9/00; G06F 8/74; G06F 8/30; G06F 3/0605; G06F 3/067; G06F 3/0637; G06F 3/0689
USPC .......................................... 713/100; 709/220
See application file for complete search history.

(56) References Cited

U.S. PATENT DOCUMENTS

| 4,974,151 | A  | * | 11/1990 | Advani et al. | 710/8 |
| 6,687,805 | B1 | * | 2/2004 | Cochran | 711/209 |
| 7,127,556 | B2 | * | 10/2006 | Blumenau et al. | 711/113 |
| 7,210,120 | B2 |   | 4/2007 | Reyna | |
| 7,219,339 | B1 |   | 5/2007 | Goyal et al. | |
| 7,401,086 | B2 |   | 7/2008 | Chorafakis et al. | |

(Continued)

FOREIGN PATENT DOCUMENTS

CN           101079737 A        11/2007

OTHER PUBLICATIONS http://publib.boulder.ibm.com/infocenter/dzichelp/v2r2/index.jsp?topic=/com. ibm.db2tools.adb.doc.ug/adbu_tutorial_reverse-eng.htm <retrieved on Sep. 21, 2010>.

(Continued)

*Primary Examiner* — Jaweed A Abbaszadeh
*Assistant Examiner* — Terrell Johnson
(74) *Attorney, Agent, or Firm* — Kunzler Law Group (57) ABSTRACT

An approach to generating logical configuration commands for logical objects in a system. A method may involve receiving a command requesting the logical configuration commands to configure the specified logical object (subject logical object) and the logical objects that support the logical object (the support logical objects). The method may also involve determining what logical objects in the system support the subject logical object. This may require determining the support logical objects that directly support the subject logical object, and then recursively examining each support logical objects to find the logical objects on which they depend. For each logical object (whether the subject logical object or one of the support logical objects), the method may involve determining the logical configuration commands to appropriately create and modify the logical object. The logical configuration commands may then be presented to the user.

20 Claims, 5 Drawing Sheets

(56) References Cited

U.S. PATENT DOCUMENTS

| | | | |
|---|---|---|---|
| 7,966,294 B1* | 6/2011 | Gupta et al. | 707/654 |
| 2004/0158621 A1* | 8/2004 | Reyna | 709/220 |
| 2005/0044312 A1* | 2/2005 | Blumenau et al. | 711/113 |
| 2006/0112173 A1* | 5/2006 | Cohn et al. | 709/220 |
| 2007/0038747 A1* | 2/2007 | Kishimoto et al. | 709/224 |
| 2007/0101058 A1 | 5/2007 | Kinnan et al. | |
| 2008/0216097 A1* | 9/2008 | Quinn et al. | 719/328 |
| 2009/0249016 A1 | 10/2009 | Acedo et al. | |
| 2010/0024031 A1 | 1/2010 | Shribman et al. | |
| 2010/0082933 A1* | 4/2010 | Fleming et al. | 711/170 |
| 2011/0119652 A1* | 5/2011 | Yu et al. | 717/108 |

OTHER PUBLICATIONS

Vemeer et al., "Reverse engineering of relational database applications", Proceedings of the 14th International Conference on Object-Oriented and Entity-Relationship Modelling, Lecture Notes in Computer Science, Dec. 1995, vol. 1021, OOER '95, pp. 89-100.

Mayrhauser et al., "Experience with a Reverse Architecture Approach to Increase Understanding", IEEE International Conference on Software Maintenance, 1999. (ICSM '99) Proceedings., Publication Year: 1999, pp. 131-138.

Stroulia et al., "User interface reverse engineering in support of interface migration to the web", Automated Software Engineering, vol. 10, No. 3, 2003, pp. 271-301.

* cited by examiner

DETERMINING LOGICAL CONFIGURATION COMMANDS TO CREATE A LOGICAL OBJECT

FIELD

The subject matter disclosed herein relates to determining the logical configuration commands that create a particular logical object and the logical objects on which the particular logical object depends.

BACKGROUND

Description of the Related Art

Many systems include both physical objects and logical objects. For example, an enterprise disk system may include numerous physical components which can be organized into logical objects such as volumes, ranks, arrays, and other logical objects that can be configured by a user. Many of these systems allow the user to set up the logical objects using a command line interface (CLI).

As budgets shrink, and IT personnel are expected to take on broader roles within an organization, it becomes increasingly difficult for a particular IT administrator to become intimately familiar with each piece of equipment within his or her preview. An IT administrator may not have the time or background to become expert in the logical configuration of a particular system. An IT administrator may not know all of the logical configuration commands necessary to create a particular logical object. Adding to the complexity of the IT administrator's task, a particular logical object that the IT administrator is interested in creating may depend upon one or more other logical objects in the system. Thus, the IT administrator may have to create a number of logical objects, and do so in the correct order, in order to create the particular logical object.

BRIEF SUMMARY

An approach to determining the logical configuration commands to configure a logical object and the logical objects on which it depends is presented. In one embodiment, the invention is realized as a computer program product. The computer program product may be configured to receive a command identifying a subject logical object for which the user desires the relevant logical configuration commands. The command requests the logical configuration commands to create the subject logical object and to create the logical objects upon which the subject logical object depends (the support logical objects). The computer program product may be configured to determine the support logical objects that support the subject logical object and, for each subject logical object and support logical object, determine the logical configuration commands for creating the logical object. These logical configuration commands may then be provided to the user.

The computer program product may also determine logical configuration commands for modifying the logical objects. The computer program product may also be configured to determine an execution order for the logical configuration commands. In certain embodiments, determine the support logical objects upon which the subject logical object depends involves identifying the logical objects identified in the attributes of the subject logical object as support logical objects. The computer program product may recursively identify the logical objects that are identified in the attributes of the support logical objects, and identify these additional logical objects as support logical objects. In certain instances, the computer program product may need to perform additional tests and checks to determine whether the logical object depends upon any logical objects that are not specified in the attributes.

The present invention may also be realized as a method. The method may involve receiving a command identifying a subject logical object for which the user desires the logical configuration commands to configure the subject logical object and its associated subject logical objects. The method may also involve determining the support logical objects that support the subject logical object and, for each logical object, determine the logical configuration commands for creating the logical object. These logical configuration commands may be presented to the user. The method may also involve determining logical configuration commands for modifying the support logical objects and/or the subject logical object, and determining the execution order for the logical configuration commands.

As noted above, the support logical objects may be identified by examining the attributes of the subject logical object and the support logical objects. Determining the support logical objects may utilize recursion, where each logical object is examined in order to determine whether it depends upon any other logical object. In certain embodiments, additional logic for finding support logical objects outside of examining the attributes may be necessary.

The present invention may also be realized as a system. The system may be any one of a number of systems that utilize logical configuration commands. In one embodiment, the system is an enterprise disk storage system that includes a plurality of storage devices. The system may also use a command line interface (CLI) to receive and execute logical configuration commands for configuring the enterprise disk storage system. The system may also include a command generation apparatus that includes a receive module, a determine module, and a report module. The receive module may receive the command identifying the subject logical object and requesting the logical configuration commands to create the subject logical object and its related support logical objects. The determine module may determine the support logical objects and the logical configuration commands to create the logical objects. The report module may provide the logical configuration commands to a user.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in microcode, firmware, or the like of programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-Ray Disc (BD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fibre cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fibre optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Figure 1:
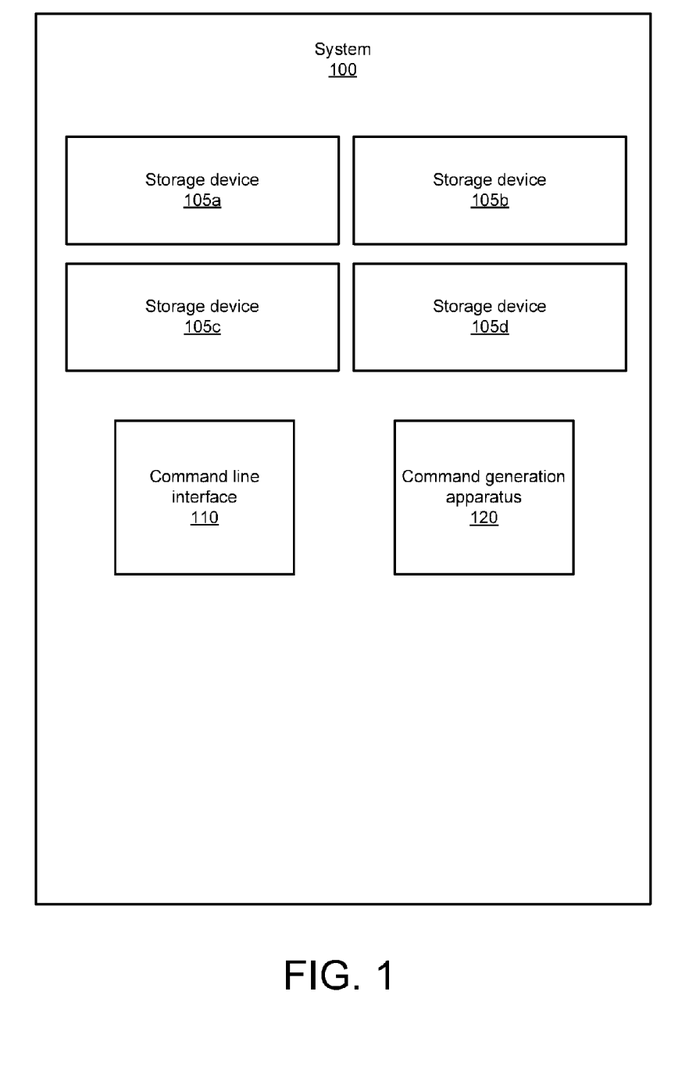
FIG. 1 is a schematic block diagram illustrating one embodiment of a system 100 including a command generation apparatus.

FIG. 1 depicts one embodiment of a system 100 which may benefit from the present invention. In the depicted embodiment, the system 100 is an enterprise disk storage system that includes storage devices 105*a-d*, a command line interface (CLI) 110, and a command generation apparatus 120. An enterprise disk storage system 100 may be complex to set up and configure with logical objects. For example, a user may need to logically partition the storage devices 105*a-d* into logical disks to be used by host applications. The system 100 may provide a user interface comprising a command line interface 110 to interact with and configure the system 100.

The system 100 may be an enterprise disk system that includes a plurality of storage devices 105*a-d*. The storage devices 105*a-d* are any storage devices comprising storage media that is suitable for use by one or more computing systems. The storage devices 105*a-d* may be hard disk drives, tape drives, solid-state storage drives, or a combination thereof. An enterprise disk storage system is only one example of a system that may benefit from using a command generation apparatus 120, and the present invention is not limited to such a system. The system 100 may also be an adapter, a network controller, and other products that use a CLI 110 to configure logical objects within the system 100. Depending on the particular system 100, certain elements shown in FIG. 1 (such as the storage devices 105*a-d*) may not be present, and other elements not shown in FIG. 1 may be present.

The user may create and modify logical objects within the system 100. Logical objects are logical items that can be created, selected, and/or manipulated within the system 100. For example, in a system 100 that is an enterprise disk storage system, the user may set up a disk array that specifies the RAID type for a set of storage devices 105*a-d*. The user may create ranks in the enterprise disk storage system. The user may specify the host type for the disk array (for example, open host, count key data (CKD) host, or other). The user may create extent pools from a collection of ranks. The extent pools may be 1 GB pieces, and when volumes are created by a user, the volumes may be created from the extent pool. The user may thus spread a volume across multiple ranks. The user may set up the disk arrays, specify the host type, the extent pools, and the volumes by entering logical configuration commands at the CLI 110. Disk arrays, ranks, extent pools, logical control units (LCUs), and volumes are all examples of logical objects in an enterprise disk storage system. Other systems may have different logical objects.

A CLI 110 is a tool for interacting with a system 100 by typing commands to perform specific tasks. One class of command that may be entered by a user (whether human or machine) is the logical configuration command. Logical configuration commands are commands that create and/or modify logical objects within a system 100. The logical configuration commands may be command line entries entered in a CLI 110. In certain embodiments, one or more logical configuration commands may be entered to create a logical object, and one or more additional logical configuration commands may be entered to modify the logical object after creation. For example, the user may enter a logical configuration command to create a volume, and enter another logical configuration command to modify one or more attributes of that volume.

The command generation apparatus 120 is a tool that allows a user to determine the logical configuration commands used to create a particular logical object (referred to as a subject logical object 310) and to create the logical objects on which the subject logical object 310 depends (referred to as support logical objects 312). For example, in order to create a particular volume in an enterprise disk storage system, a logical configuration command may be necessary for the identified volume, and also for the extent pool and ranks upon which that logical volume is built. In addition, the volume, extent pool, and rank may need to be modified in order to fully recreate the particular volume that is the subject logical object 310. The command generation apparatus 120 may be used to determine the logical configuration commands that were used to create and modify the subject logical object 310 and the support logical objects 312. Thus, the command generation apparatus 120 may help a user to obtain all of the logical configuration commands that were used to create the subject logical object 310 and all of the underlying support logical objects 312 on which the subject logical object 310 depends.

In certain sections of the application, the application may describe actions to be taken for each logical object, without specifying whether the logical object is the subject logical object 310 or a support logical object 312. Such uses of the term logical object refer to both the subject logical object 310 and the support logical object 312. For example, stating that the command generation apparatus 120 determines, for each logical object, one or more logical configuration commands for creating the logical object means that the command generation apparatus 120 determines for the logical configuration commands for creating each subject logical object 310 and determines the logical configuration commands for creating each support logical object 312.

Figure 2:
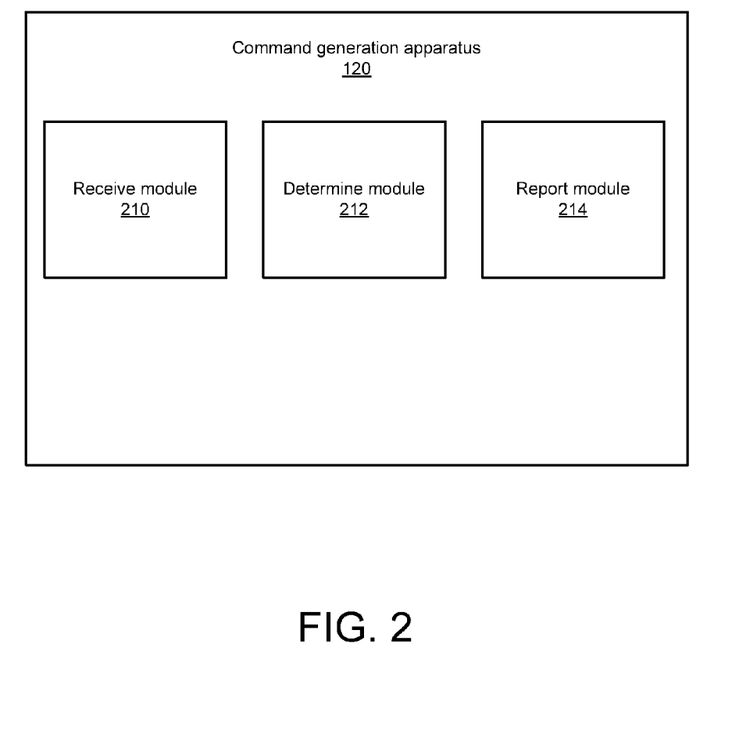
FIG. 2 is a schematic block diagram illustrating one embodiment of a command generation apparatus.

FIG. 2 shows one embodiment of a command generation apparatus 120. In one embodiment, the command generation apparatus 120 includes a receive module 210, a determine module 212, and a report module 214. In certain embodiments, the command generation apparatus 120 is configured to determine the logical configuration commands used to create the subject logical objects 310 identified in the command and those support logical objects 312 upon which the specified logical objects depend.

In one embodiment, the receive module 210 is configured to receive a command identifying a subject logical object 310. The command may be entered at the CLI 110. As explained above, a subject logical object 310 is a logical object which the user wants to find logical configuration commands for, along with the logical configuration commands for the logical objects upon which the subject logical object 310 depends (the support logical objects 312). In certain embodiments, the command may be entered by a human user who wants to understand how a particular subject logical object 310 and its related support logical objects 312 were created. In other embodiments, the command may be entered by a computer user. In certain embodiments, the receive module 210 may receive a command identifying multiple subject logical objects 310.

The command may instruct the command generation apparatus 120 to provide the logical configuration commands that should be entered at the CLI 110 in order to create the subject logical object 310 identified in the command, along with the logical configuration commands to be entered at the CLI 110 in order to create the support logical objects 312 on which the subject logical object 310 depends. In one embodiment, the command identifies the subject logical object 310 and requests the logical configuration commands to create the subject logical object 310. The instruction to generate the logical configuration commands for the support logical objects 312, as well as the subject logical object 310, may be provided using a variety of approaches; for example, a command line flag, a GUI menu option, a unique command, or other methods may be provided to allow a user (whether human or automated) to request the logical configuration commands for the support logical objects 312 in addition to those logical configuration commands for the subject logical object 310.

When receive module 210 receives the command, the determine module 212 may be configured to then determine which support logical objects 312 support the logical object. A logical object may be deemed to be a logical object that supports the subject logical object 310 depends if the subject logical object 310 cannot be created and modified without the logical object. For example, a subject logical object 310 that is a volume may depend on a rank; that is, the volume cannot be replicated without also replicating the rank.

In one embodiment, determining the support logical objects 312 is accomplished at least in part by identifying the logical objects that are identified in the attributes of the subject logical object 310. The logical objects listed in, or discernable from, the attributes may be identified as support logical objects 312. The determine module 212 may then examine the attributes for these newly-identified support logical objects 312 to determine if they, in turn, depend on other logical objects. Such logical objects may also be identified as support logical objects 312. In one embodiment, the determine module 212 may recursively identify the logical objects that are identified in the attributes of the support logical object 312 and identify these logical objects as support logical objects 312. This may involve iterating through the logical objects that have been identified as support logical objects 312 and determining, for each such logical object, whether it depends on any other logical object. This process may continue until all logical objects supporting the subject logical object 310 have been identified. One example of this is discussed in FIG. 3.

In certain embodiments, the determine module 212 determines whether a particular logical object has already been identified as a support logical object 312. In embodiments where the determine module 212 creates a data structure storing the identified support logical objects 312, the determine module 212 may be configured to ensure that no logical object is entered more than once in the data structure.

As mentioned above, in certain embodiments, some or all of the support logical objects 312 that support a particular logical object may be identified in the attributes of that particular logical object. However, in certain embodiments, the support logical objects 312 may not be identified in the attributes of the logical object being examined. In such situations, the determination module 212 may be configured to otherwise examine the logical objects in a system 100 and determine how they are connected.

For example, a particular logical object may have numerous support logical objects 312; where there are numerous support logical objects 312, they may not all be specified in the attributes. In certain enterprise disk storage systems, for example, a logical object that is a volume may not contain information about the supporting ranks. The volume may consist of 1 GB chunks called extents, as mentioned above. The hard drives may be grouped together in sets of eight and configured into ranks. Each rank may be assigned to an extent pool. The extent pool can have hundreds of ranks assigned to it; when the volume is created, the volume can use extents from each of the ranks.

In order to determine the logical configuration commands to generate a given volume, a user may need to know how to create the extent pool and all of the ranks that the volume is using extents from. The volume may identify the extent pool in its attributes; however, it may not list all of the ranks from which the volume is using extents. In such an embodiment, the determination module 212 may execute a query to request the list of ranks that are contributing extents to the volume. In this manner, the determination module 212 can find the support logical objects 312 (for example, the ranks) that are not listed in the attributes for the logical object (in this example, the volume).

In certain embodiments some, but not all, of the support logical objects 312 for a particular subject logical object 310 may be determined using the attributes for the subject logical object 310 and the support logical objects 312. In such embodiments, the determine module 212 may need to execute additional code to determine which logical objects are support logical objects 312 but that are not identified in the attributes. The nature of the code may vary based on the particulars of the system 100 where the command generation apparatus 120 is implemented. Thus, the determination module 212 may, for each subject logical object 310 and identified support logical object 312, determine whether the logical object depends upon any other logical object that is not specified in the attributes.

When the subject logical objects 310 and the support logical objects 312 have been identified, the determine module 212 may determine what logical configuration commands can be used to create the relevant subject logical objects 310 and support logical objects 312. In certain embodiments, the determine module 212 also determines what modifications need to be made, and determines the logical configuration commands for modifying the logical objects. In one embodiment, the logical configuration commands used to create the logical objects (the subject logical object 310 and the support logical objects 312) were stored in a configuration library. In such embodiments, the logical configuration commands may be retrieved from the configuration library by the determine module 212. The determine module 212 may also determine an execution order for the one or more logical configuration commands.

The command generation apparatus 120 may also include a report module 214 to provide the one or more logical configuration commands to a user. As mentioned above, the user may be a human user or a computer user. In certain embodiments, the report module 214 displays the logical configuration commands on a display for the user. The report module 214 may store the logical configuration commands in a file for access by the user. Numerous approaches to providing a user with the one or more logical configuration commands may be used by the report module 214.

Figure 3:
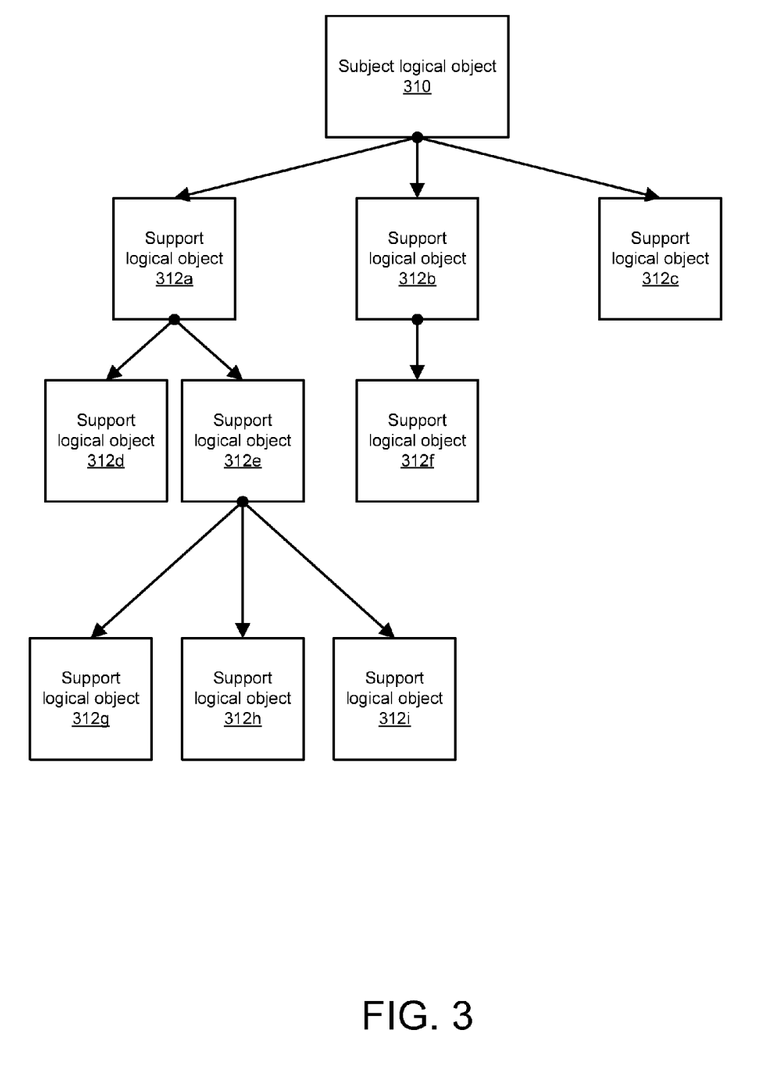
FIG. 3 is a schematic block diagram illustrating one representation of a subject logical object and support logical objects.

FIG. 3 shows one embodiment of a subject logical object 310 and support logical objects 312a-i. In one embodiment, the user enters a command at the CLI 110 identifying the subject logical object 310, and requesting the logical configuration commands to create the subject logical object 310 and the support logical objects 312a-i. The user may not know which logical objects in a system are support logical objects 312a-i.

In one embodiment, the command generation apparatus 120, upon receiving the command, determines which logical objects support the subject logical object 310, and classifies them as support logical objects 312a-i. The command generation apparatus 120 may, for example, examine the subject logical object 310 and may determine that the support logical objects 312a-c support the subject logical object 310. The command generation apparatus 120 may then continue to examine the logical objects recursively; that is, the command generation apparatus 120 may check each support logical object 312a-c to determine whether there are additional support logical objects 312 that support the support logical objects 312a-c. In the example shown in FIG. 3, the command generation apparatus 120 may identified support logical objects 312d and 312e as supporting support logical object 312a, and support logical object 312f as supporting support logical object 312b. The command generation apparatus 120 may determine that no additional logical objects support the support logical object 312c. The command generation apparatus 120 may then determine that support logical objects 312g, 312h, and 312i support the support logical object 312e, and that no additional logical objects support the support logical objects 312d and 312f. The command generation apparatus 120 may continue to iterate over the identified support logical objects 312a-i until it determines that there are no additional support logical objects 312 that support the subject logical object 310.

As noted above, the command generation apparatus 120 may store the identities of the support logical objects 312a-i in a data structure such as a list or an array. The command generation apparatus 120 may determine the logical configuration commands that create the logical objects, including the subject logical object 310 and the support logical objects 312a-i. In certain embodiments, the command generation apparatus 120 may also determine one or more logical configuration commands to modify one or more of the logical objects. The command generation apparatus 120 may then provide the logical configuration commands to a user.

In certain embodiments, the command generation apparatus 120 may determine an execution for the logical configuration commands. For example, since the support logical object 312e depends on the support logical objects 312g, 312h, and 312i, the command generation apparatus 120 may determine that the support logical objects 312g-i should be created and modified prior to creating the support logical object 312e. Since the support logical objects 312d and 312f, 312c, and 312g-i do not depend on any other logical object, the command generation apparatus 120 may determine that it does not matter in which order these support logical objects 312 are created and modified in relation to each other. FIG. 3 can also be described in terms of parent-child relationships. In certain embodiments, the command generation apparatus 120 prepares an execution order that ensures that child logical objects are created and/or modified before a parent for that logical object is created and/or modified.

Figure 4:
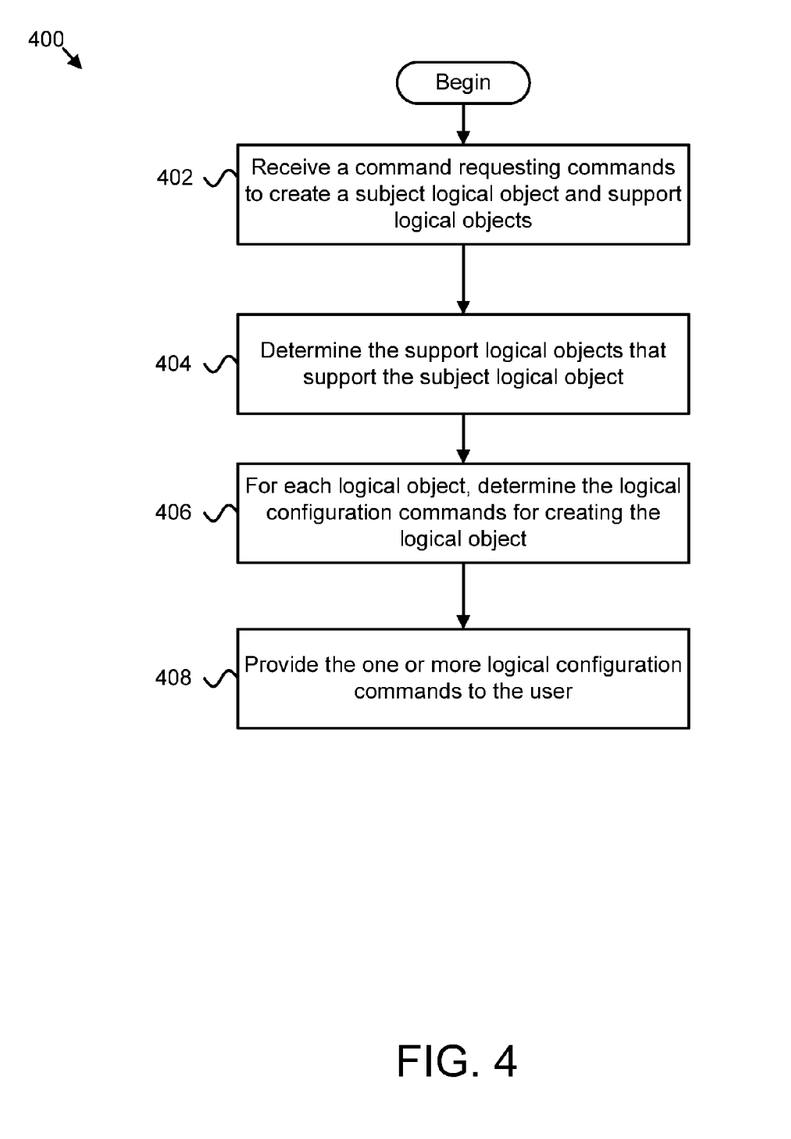
FIG. 4 is a flow chart diagram illustrating one embodiment of a method for generating logical configuration commands for a subject logical object and its support logical objects.

FIG. 4 shows one embodiment of a method 400 for determining the logical configuration commands to configure a subject logical object 310 and its associated support logical objects 312. The method 400 begins with receiving 402 a command identifying a subject logical object 310. The command requests one or more logical configuration commands to create the subject logical object 310 and to create one or more support logical objects 312 upon which the subject logical object 310 depends. The method may also involve determining 404 the support logical objects 312 that support the subject logical object 310. As shown in FIG. 3, this may involve determining not only those support logical objects 312 that directly support the subject logical object 310 (such as the child support logical objects 312a-c shown in FIG. 3), but also the support logical objects 312 that support other support logical objects 312 (such as support logical objects 312d-i).

In certain embodiments the method 400 also includes determining 406, for each logical object (whether the subject logical object 310 or the support logical objects 312), the logical configuration commands for creating the logical object. These logical configuration commands may be provided 408 to the user.

Figure 5:
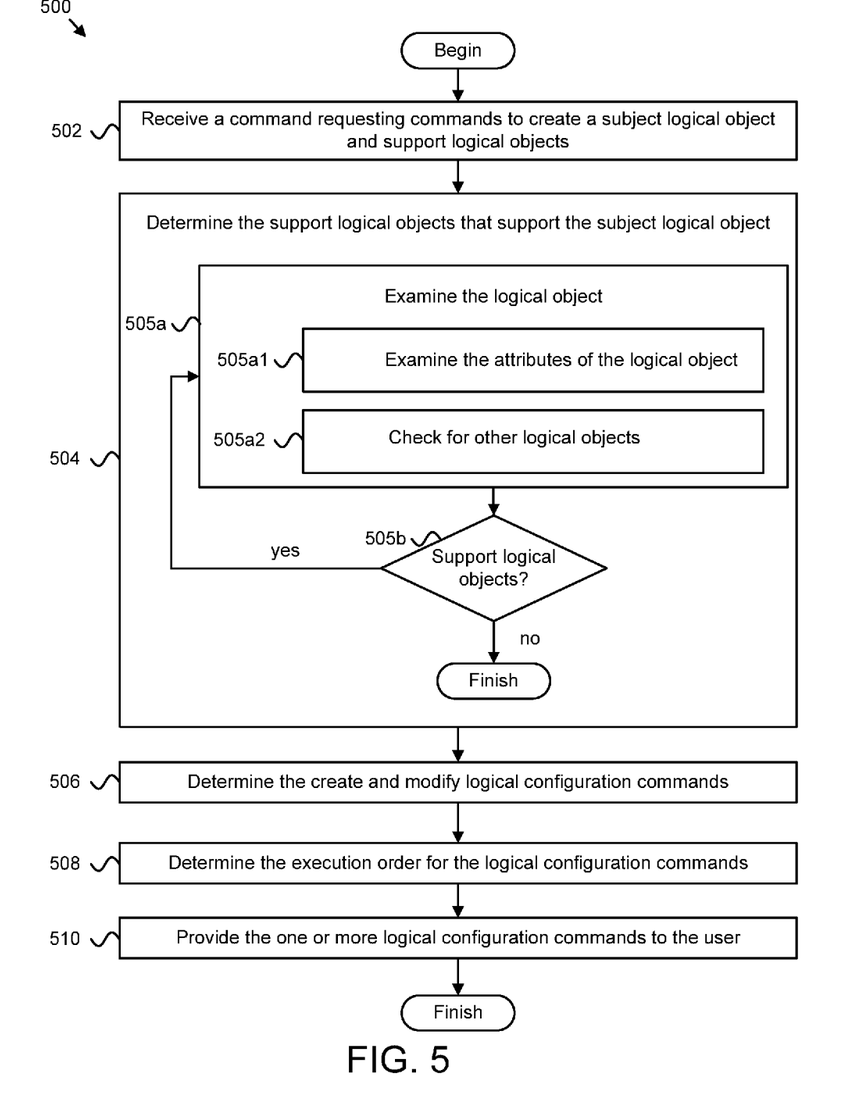
FIG. 5 is a flow chart diagram illustrating a second embodiment of a method for generating logical configuration commands for a subject logical object and its support logical objects.

FIG. 5 shows a second embodiment of a method 500 for determining the logical configuration commands to configure a subject logical object 310 and its associated support logical objects 312. As in FIG. 4, the method may begin with receiving 502 a command requesting commands to create a subject logical object 310 and support logical objects 312. The method 500 may also involve determining 504 the support logical objects 312 that support the subject logical object 310. FIG. 5 shows one manner in which this step 504 may be accomplished.

In one embodiment, the step 504 further includes examining 505a the particular logical object (whether the subject logical object 310 or a support logical object 312) to determine the support logical objects 312 associated with it. This, in turn, may include examining 505a1 the attributes of the logical object, and checking 505a2 for other support logical objects 312 that are not identified in the attributes, as explained above. If, after examining the logical object, it is determined 505b that there are support logical objects 312 for the logical object, the examination step 505a is repeated for each support logical object 312. Once all support logical objects 312 are determined, such that the result of the determination 505b is "no", the determination steps 504 is deemed complete.

In one embodiment, the step 504 begins by examining the subject logical object 310. The process then repeats for each support logical object 312, and continues for each support logical object 312 that is identified, until all support logical objects 312 for the subject logical object 310 are identified.

In certain embodiments, the method 500 includes determining 506 the create and modify logical configuration commands for the subject logical objects 310 and the support logical objects 312. The method 500 may also include determining 508 the execution order for the logical configuration commands. The method 500 may also involve providing 510 the one or more logical configuration commands to the user.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising computer readable code stored on a non-transitory computer readable medium, the computer program product comprising code that when executed by a processor is configured to:

receive a command identifying a subject logical object, wherein the command requests one or more logical configuration commands to independently create the subject logical object and one or more support logical objects, wherein the one or more support logical objects are logical objects on which the subject logical object depends;

determine the one or more support logical objects;

for each support logical object, determine whether the support logical object is stored in a data structure of identified support logical objects and storing the support logical object in the data structure in response to determining that the support logical object is not stored in the data structure;

for each subject logical object and support logical object stored in the data structure, determine one or more logical configuration commands for independently configuring the logical object, wherein the one or more logical configuration commands are stored in a configuration library; and provide to a user, for each logical object, the one or more logical configuration commands for independently configuring the logical object.

2. The computer program product of claim 1, further comprising determining an execution order for the one or more logical configuration commands.

3. The computer program product of claim 1, wherein determining one or more logical configuration commands for independently configuring the logical object further comprises determining one or more logical configuration commands for independently creating the logical object and one or more logical configuration commands for modifying the logical object.

4. The computer program product of claim 1, wherein determining the one or more support logical objects comprises: for the subject logical object, identifying the logical objects identified in the attributes of the subject logical object as support logical objects.

5. The computer program product of claim 4, wherein determining the one or more support logical objects further comprises: recursively identifying the logical objects identified in the attributes of the support logical objects, and identifying said logical objects as support logical objects.

6. The computer program product of claim 5, wherein recursively identifying the logical objects identified in the attributes of the support logical objects comprises determining, for each logical object, whether the logical object depends on any other logical object.

7. The computer program product of claim 4, wherein determining the one or more support logical objects further comprises: for each logical object, determining whether the logical object depends upon any logical object that is not specified in the attributes for the logical object.

8. A method comprising the steps of:

receiving a command identifying a subject logical object, wherein the command requests one or more logical configuration commands to independently create the subject logical object and one or more support logical objects, wherein the one or more support logical objects are logical objects on which the subject logical object depends;

determining the one or more support logical objects;

for each support logical object, determine whether the support logical object is stored in a data structure of identified support logical objects and storing the support logical object in the data structure in response to determining that the support logical object is not stored in the data structure;

for each subject logical object and support logical object stored in the data structure, determining one or more logical configuration commands for independently configuring the logical object, wherein the one or more logical configuration commands are stored in a configuration library; and providing to a user, for each logical object, the one or more logical configuration commands for independently configuring the logical object.

9. The method of claim 8, further comprising determining an execution order for the one or more logical configuration commands.

10. The method of claim 8, wherein determining one or more logical configuration commands for independently configuring the logical object further comprises determining one or more logical configuration commands for independently creating the logical object and one or more logical configuration commands for modifying the logical object.

11. The method of claim 8, wherein determining the one or more support logical objects comprises: for the subject logical object, identifying the logical objects identified in the attributes of the subject logical object as support logical objects.

12. The method of claim 11, wherein determining the one or more support logical objects further comprises: recursively identifying the logical objects identified in the attributes of the support logical objects, and identifying said logical objects as support logical objects.

13. The method of claim 12, wherein recursively identifying the logical objects identified in the attributes of the support logical objects comprises determining, for each logical object, whether the logical object depends on any other logical object.

14. The method of claim 11, wherein determining the one or more support logical objects further comprises: for each logical object, determining whether the logical object depends upon any logical object that is not specified in the attributes for the logical object.

15. A system comprising:
an enterprise disk storage system comprising a plurality of storage devices;
a command line interface configured to receive and execute logical configuration commands for configuring the enterprise disk storage system;
a command generation apparatus comprising:
   a receive module configured to receive a command identifying a subject logical object, wherein the command requests one or more logical configuration commands to independently create the subject logical object and one or more support logical objects, wherein the one or more support logical objects are logical objects on which the subject logical object depends;
   a determine module configured to determine the one or more support logical objects and,
      for each support logical object, determine whether the support logical object is stored in a data structure of identified support logical objects and storing the support logical object in the data structure in response to determining that the support logical object is not stored in the data structure;
      for each subject logical object and support logical object stored in the data structure, determine one or more logical configuration commands for independently configuring the logical object, wherein the one or more logical configuration commands are stored in a configuration library; and
   a report module configured to provide to a user, for each logical object, the one or more logical configuration commands for independently configuring the logical object.

16. The system of claim 15, wherein the logical objects are logical objects on the enterprise disk storage system.

17. The system of claim 15, wherein the determine module is further configured to determine an execution order for the one or more logical configuration commands.

18. The system of claim 15, wherein the determine module determining one or more logical configuration commands for independently configuring the logical object further comprises determining one or more logical configuration commands for independently creating the logical object and one or more logical configuration commands for modifying the logical object.

19. The system of claim 15, wherein determining the one or more support logical objects comprises: for the subject logical object, identifying the logical objects identified in the attributes of the subject logical object as support logical objects.

20. The system of claim 19, wherein determining the one or more support logical objects further comprises: recursively identifying the logical objects identified in the attributes of the support logical objects, and identifying said logical objects as support logical objects.

* * * * *